United States Patent [19]
Randall et al.

[11] Patent Number: 4,789,994
[45] Date of Patent: Dec. 6, 1988

[54] ADAPTIVE EQUALIZER USING PRECURSOR ERROR SIGNAL FOR CONVERGENCE CONTROL

[75] Inventors: Roderick K. Randall, Newark; William F. Zucker, Randolph, both of N.J.

[73] Assignee: American Telephone and Telegraph Company, AT&T Bell Laboratories, Murray Hill, N.J.

[21] Appl. No.: 84,356

[22] Filed: Aug. 12, 1987

[51] Int. Cl.[4] .................................................. H04B 3/14
[52] U.S. Cl. .................................... 375/12; 364/724.2; 333/18
[58] Field of Search ............... 375/12, 14, 15; 333/18, 333/28; 364/724; 381/103

[56] References Cited

U.S. PATENT DOCUMENTS

| | | | |
|---|---|---|---|
| 3,697,689 | 10/1972 | Gibson | 375/119 |
| 3,792,356 | 2/1974 | Kobayashi et al. | 375/14 |
| 3,898,564 | 8/1975 | Waldhauer et al. | 375/14 |
| 4,170,758 | 10/1979 | Tamburelli | 375/14 |
| 4,283,788 | 8/1981 | Tamburelli | 375/14 |
| 4,288,872 | 9/1981 | Tamburelli | 333/18 |
| 4,468,786 | 8/1984 | Davis | 364/724 |
| 4,494,242 | 1/1985 | Ehrenbard et al. | 375/118 |
| 4,504,958 | 3/1985 | Tamburelli | 375/12 |
| 4,597,088 | 6/1986 | Posti et al. | 375/12 |

OTHER PUBLICATIONS

"Decision Feedback and Feedforward Receiver (for Rates Faster than Nyquist's)", by G. Tamburelli, CSELT Rapporti Tecnici—N. 2—GIUGNO 1976, pp. 97–105.

"Towards a Single Chip ISDN Transmission Unit", by K. J. Wouda et al, (ISSLS 86) The International Symposium on Subscriber Loops and Services, Sep. 29–Oct. 3, 1986, Tokyo, Japan, pp. 250–255.

*Primary Examiner*—Robert L. Griffin
*Assistant Examiner*—Stephen Chin
*Attorney, Agent, or Firm*—Jack S. Cubert

[57] ABSTRACT

Operation of a decision feedback equalizer is enhanced by measuring the intersymbol interference precursor effect on each symbol decision output and utilizing that measurement information to update equalizer, transversal filter, tap multiplier coefficients in a direction to reduce the precursor and postcursor effects. In one embodiment, the updated coefficient information is further utilized to adjust equalizer input signal sampling phase toward a time of maximum data signal eye opening.

11 Claims, 7 Drawing Sheets

ADAPTIVE EQUALIZER USING PRECURSOR ERROR SIGNAL FOR CONVERGENCE CONTROL

FIELD OF THE INVENTION

This invention relates to adaptive decision feedback equalizers, and it relates more particularly to such equalizers with intersymbol interference precursor effect compensation.

BACKGROUND OF THE INVENTION

Less than perfect signal transmission line characteristics cause intersymbol interference in transmitted data signals. The extent of the interference depends upon the length and the impulse response characteristic of the transmission line. If signal trace displays of multiple successive data symbols are superimposed, e.g., as in an oscilloscopic display, the resulting composite display defines a generally elliptical figure with somewhat pointed ends on the major, and usually horizontally displayed, axis including both foci and having a central opening of a vertical size that is a function of the extent of intersymbol interference contained in the signal. Such a display is commonly said to be an eye pattern, or eye, because of its general similarity to the frontal view of the human eye with the eyelid open. Signal detection error rate is usually lowest for properly sampled signals exhibiting the most widely open eye and for which detection sampling takes place in the data signal bit time phase of widest eye, i.e. the phase of the minor axis of the ellipse defined by the eye opening.

Intersymbol interference in the form of extension of the trailing edge of a data symbol into the symbol time of at least one following symbol is said to be postcursor interference, and interference in the form of extension of the leading edge of a data symbol into symbol times of at least one preceding symbol is said to be precursor interference. In either a switched or a private line digital system for telecommunication, hereinafter simply "digital transmission circuit," there is a relatively wide range of circuit characteristics that may be encountered in establishing a digital connection for, e.g., a special service circuit. In addition, those digital transmission circuits are usually required to transmit high speed data, e.g., data at more than 100 kilobits per second (kbps), as compared to low speed data, e.g., at about 4.8 kbps. High speed data is therefore subject to greater intersymbol interference, especially that due to bridged taps on a line such as are commonly present on data circuits. Consequently, the impulse responses of circuits included in a digital transmission circuit differ widely, and unpredictably, in configuration; and often exhibit substantial lack of symmetry about a time of maximum amplitude. An equalizer employed in such a facility, must therefore, be able to equalize a wide range of circuits in order that a large inventory of different equalizer types not be required.

Decision feedback equalizers are known in the art to be advantageous for dealing with intersymbol interference in multilevel digital data circuits because they are relatively simple in that signal multiplications can be accomplished by relatively simple logic, e.g. additions, subtractions, and shift circuitry to accommodate multiplications by 2, rather than by complex analog or digital multipliers. Decision feedback equalizers, in general, include arrangements to make data decisions that quantize the received signal amplitude into 1 of N possible states, where N corresponds to the number of distinct levels which must be decoded, and produce a corresponding output. They also include feedback of the same output through an estimation filter, such as a multitap, adaptive, transversal filter, designed to extract postcursor interference components from the output and apply them in a canceling relation to the equalizer input. In the specific case of a binary system considered hereinafter, e.g., ONE-ZERO data represented by $+1$ and $-1$ symbols, the decision feedback equalizer must make a binary ONE-ZERO decision and produce a corresponding output. Since the estimation filter receives a binary type of input signal rather than a multilevel input signal, the tap coefficient update and convolution logic can be relieved of multipliers and use addition and subtraction circuits which are simpler to implement.

U.S. Pat. Nos. 4,170,758 and 4,283,788 to G. Tamburelli teach such an equalizer configuration, and they also show arrangements for coupling the equalizer output through multiple sections, or cells, of filters for extracting precursor components and combining them in subtractive relation with differently delayed predecision versions of the signal to compensate for the precursor aspect of the signal. The number of cells required depends upon the extent of precursor included in the impulse responses of the circuits being equalized as shown in a Tamburelli paper "Decision Feedback and Feedforward Receiver (for rates faster than Nyquist's)" in CSELT Rapporti tecnici, Vol. 4, No. 2, pages 97–105, June 1976. Thus, a designer must strike a compromise between the expense of providing enough cells to equalize for the worse case circuit conditions and the range of circuits desired to be equalized with a given equalizer. The Tamburelli equalizer appears not to be adaptive as to at least the precursor equalization Linear adaptive equalizers employing transversal filters are, of course, known in the art; but they usually require complex, and hence costly, circuitry for real time updating of tap coefficients and for multiplication of coefficients with the respective tap signals. The high cost flows at least in part from the fact that multibit value representations must be multiplied together, and that is relatively costly. Furthermore, such equalizers are typically used in conjunction with an input signal sampling circuit that samples arbitrarily in a certain time phase, e.g., the center of each bit time, without regard for whether or not that is the time of maximum eye opening. Consequently, signal detection error rates are often much less than optimum. Multiple samples per bit time are also employed to obey the nyquist criterion and share the pulse, but that involves the complexity and cost of dealing with more samples per bit time.

A linear equalizer approach to both precursor and postcursor equalization is shown by H. Kobayashi et al. in U.S. Pat. No. 3,792,356. Here input signal from a channel is reshaped by equalization and coupled to a circuit output. The input signal is applied through a precursor equalizer and a summing circuit to a main equalizer, the output of which, after quantization, is fed back to the summing circuit to be additively combined with the precursor equalizer output. In one embodiment, the precursor equalization function is incorporated into at least one additional tap in the main equalizer.

Another linear equalizer is shown by an E.D. Gibson, U.S. Pat. No. 3,697,689. Here a fine timing recovery system for high speed data transmission systems couples receiver input signals from a circuit of known impulse response through a transversal equalizer to be reshaped before outputting. It is necessary that the impulse response be essentially symmetrical with respect to the main tap. Gibson utilizes adjusted tap signals on either side of the main tap to derive a signal indicative of the difference between the two tap signals to control the phase of a clock signal used in the receiver to a phase of essentially zero difference. Sampling is then performed midway between the phases corresponding to the two taps.

A paper "Towards a Single Chip ISDN transmission Unit" by K. J. Wonda et al., appeared in Proceedings ISSLS '86 at pages 250-255. The authors consider a linear equalizer with a two-tap, fixed-coefficient, filter to produce a signal which, when optimized forces the precursor to zero at the sampling point. The Wouda et al. timing control is responsive to the precursor effect and independent of data signal main cursor amplitude.

An Ehrenbard et al., U.S. Pat. No. 4,494,242 exercises sampling phase control by comparing signal samples at precursor and main cursor times and using the result to control sampling phase. The ratio of the precursor tap to the main cursor tap is chosen on a compromise basis to accommodate the channel response of the set of subscriber loops for the particular digital system under consideration. The sampling time is aligned to coincide with zero precursor instant induced by the multiplication of the received signal by the precursor top and then subtracting this result from the received signal that received one sample time previous.

SUMMARY OF THE INVENTION

The foregoing difficulties with prior equalizers are mitigated in accordance with the present invention by measuring the intersymbol interference precursor effect in each baud signal decision output of an adaptive, decision feedback equalizer. All transversal filter tap coefficients in the equalizer are updated in response to a multiple cursor effect estimate, which includes the precursor effect estimate, to reduce the postcursor effect. In one embodiment, the estimate is achieved by a precursor equalizer responsive to the decision output; and the updated tap coefficients of that equalizer are employed to control the phase of sampling of input signals to the decision feedback equalizer to achieve sampling at approximately the phase of maximum opening of the data signal eye for the particular signal being received.

BRIEF DESCRIPTION OF THE DRAWING

A more complete understanding of the invention and its various features, objects, and advantages may be obtained from a consideration the the appended claims in conjunction with the Detailed Description and the attached drawings in which

DETAILED DESCRIPTION

Figure 1:
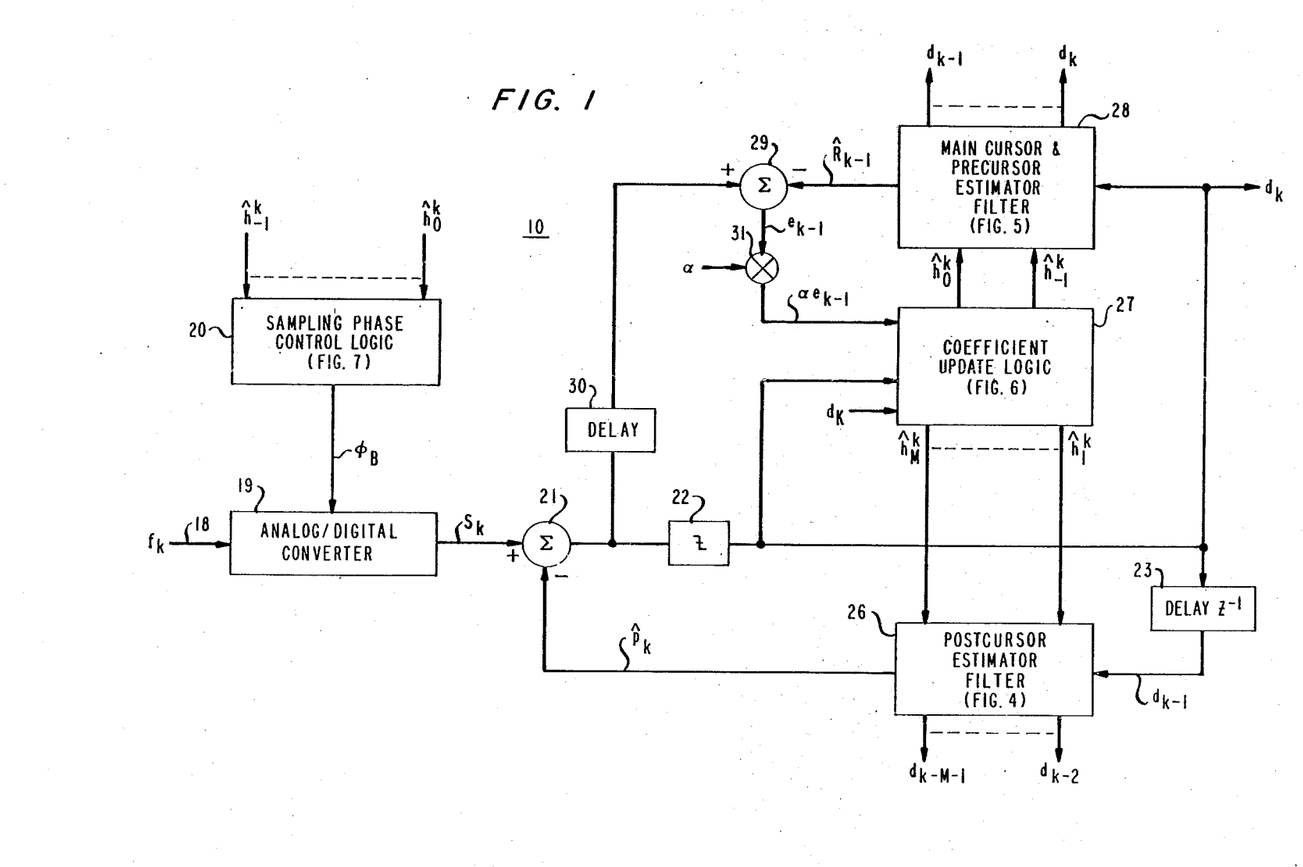
FIG. 1 is a block and line diagram of an equalizer in accordance with the invention.
Figure 2:
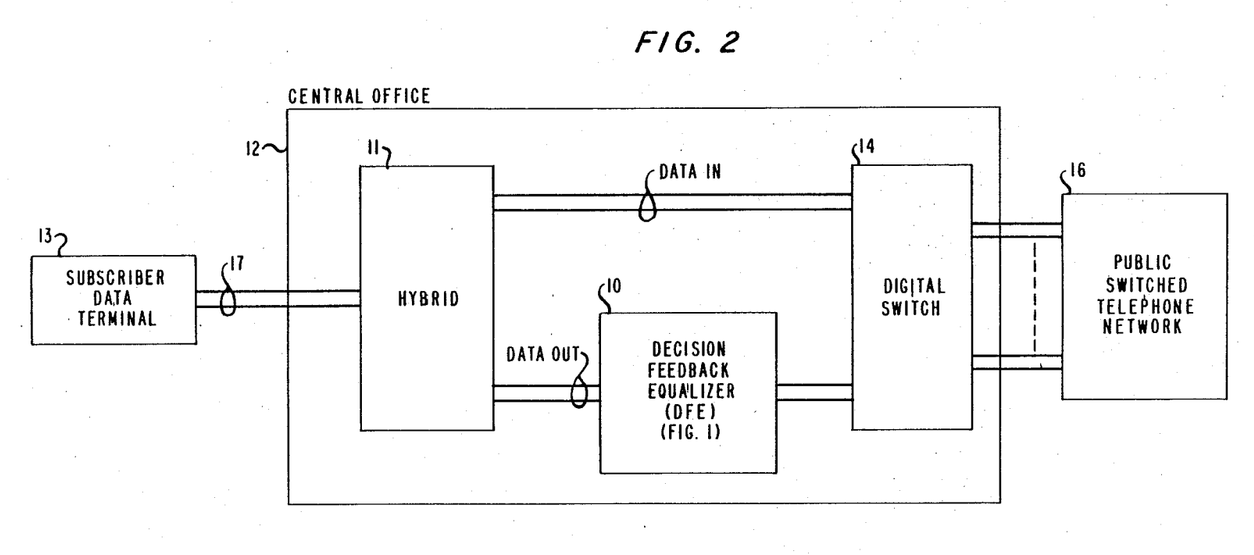
FIG. 2 is a simplified block and line diagram of a telephone system employing the FIG. 1 equalizer.

FIG. 1 depicts an illustrative adaptive, decision feedback equalizer (DFE). The equalizer would be illustratively employed in a telecommunication system such as that shown in FIG. 2 where the equalizer 10 is in the data-out path on the 4-wire side of a 2-wire-4-wire hybrid circuit 11 in a telephone central office 12. The office includes a digital switch 14 and provides switchable interconnection between a digital, telecommunication subscriber station, such as subscriber data terminal 13, and the public switched telephone network (PSTN) 16 as is well known in the art. The hybrid circuit couples signals from the PSTN 16 via a data-in circuit to a 2-wire, non-loaded, subscriber loop circuit 17 that provides telecommunication service to the station 13. In a system providing a spectrum of telecommunication services such as voice, video, and data, the hybrid circuit 11 advantageously includes functions such as echo canceling and gain compensating analog equalization for processing signals from station 13 before application to equalizer 10, for intersymbol interference processing, on the way to the PSTN via a data-out circuit.

In FIG. 1, a continuous analog input signal $f_k$ is received on a circuit 18, corresponding to the portion of the data-out circuit from hybrid 11 in FIG. 2, and applied to an input of a sampling analog-to-digital converter circuit 19 is $f_k$ advantageously scaled to use the full dynamic range of converter 19. The character "k" indicates an arbitrary signal sampling time in the DFE adaptation sequence and may appear below in either a subscript or a superscript position. In an application where the DFE is in a private line circuit that is typically not switched after it has once been established, the adaptation sequence is initially completed at circuit set up time and continuously adaptive thereafter in response to changes in characteristics of the transmission medium. The converter circuit 19 is recurrently actuated at the input data signal bit rate, e.g., 160 kilobits per second (kbps), by bit-rate clock pulses $\phi_B$ from a sampling phase control logic circuit 20, to be described in connection with FIG. 7. Converter 19 provides a series of multibit binary coded sample amplitude value signals $S_k$, e.g., 8-bit digital words transmitted in bit-parallel format, to one input of a multibit, digital adder 21.

Figure 3:
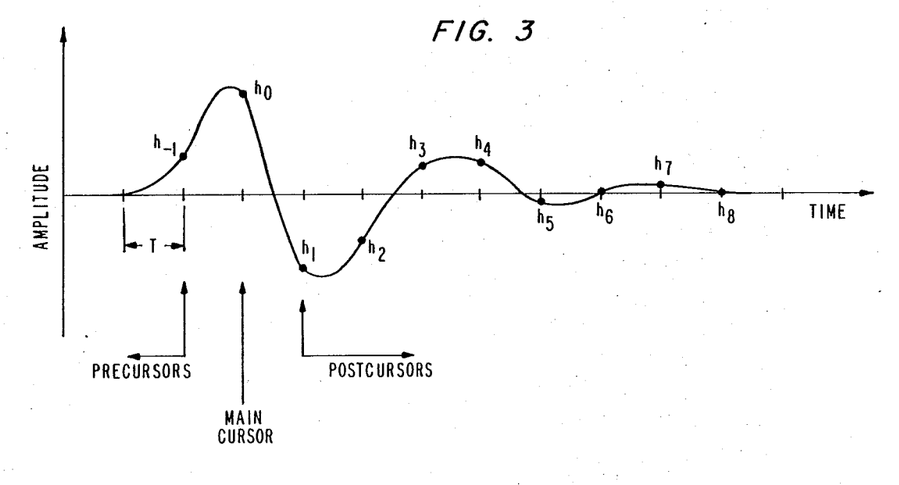
FIG. 3 is an impulse response diagram useful in understanding operation of the invention.

The multilevel data signals provided to equalizer 10 of FIG. 1 typically include intersymbol interference (ISI) of the type illustrated by an impulse response diagram in FIG. 3. One practical circuit transmits analog signals at a $f_k = 160$ kilobits per second over a twisted pair of wires in a telephone customer loop circuit. Private line circuits of that sort exhibit impulse responses that vary so widely from one to another that automatic equalization is usually employed to set them up. The FIG. 3 diagram shows only one configuration of one illustrative circuit, and many other configurations are possible. In the FIG. 3 diagram, pulse signal amplitude samples, or cursors, $\underline{h}$ are indicated at times spaced by a time T. The main cursor is indicated as $h_0$, and other similarly subscripted cursor reference characters $h_1$ et cetera indicate trailing intersymbol interference effects from signals prior in time, i.e. postcursors, and the reference character $h_{-1}$ indicates leading intersymbol interference effects from signals later in time, i.e. precursors, as shown on the diagram. The size of $h_0$ is determined by the transmit voltage level as well as the channel attenuation and the sampling phase. It is usually desirable that the main cursor sampling time occur as close as possible to the pulse peak so that the data signal eye will exhibit the maximum opening and signal reception will occur with a minimum error rate. It is usually considered that if the sampling phase is off, the main cursor sample $h_0$ is off peak and has a reduced amplitude; consequently the eye pattern has a reduced size, and a correspondingly increased error rate can be expected. However, a modification of that expectation has been discovered and is presented herein.

Ideally, in the absence of intersymbol interference, i.e. $h_{-1}=h_1=\ldots h_\infty=0$, the size of a data signal eye opening would be twice the amplitude of the main cursor because that cursor may be either a binary ONE or ZERO for any given bit. In the presence of precursors, the data eye opening is determined both by the main cursor $h_0$ of a current data bit time k and by the precursor $h_{-1}$ of the next data bit time $k+1$ in the DFE adaptation sequence, which precursor represents the effect of a data bit that has yet to be received. In the current bit time k a conventional DFE has not decided upon that precursor and cannot subtract away its contribution. This adds uncertainty to the symbol states of the presently received bit. For example, a transmitted logic ONE could cause the reception of $h_0{}^k + h_{-1}{}^{k+1}$ or $h_0{}^k - h_{-1}{}^{k+1}$ depending upon whether the following transmitted bit was respectively a logic ONE or ZERO. Consequently the data signal eye opening is reduced directly by the precursor part of intersymbol interference.

Adaptive decision feedback equalizers, and in particular, adaptive DFEs are often used to correct at least in part for the ISI. Such adaptive DFEs often include a transversal filter in which signal delay line tapping point signals, representing previously detected and differently delayed data bits, are multiplied by transmission circuit impulse response coefficient estimates before the tap signal are summed to produce the filter output signal that is used to compensate for postcursor effects. In the illustrative binary embodiment considered here, tap multiplications are reduced to additions and subtractions because of the binary nature of the detected data. The coefficients are adjusted in response to a least mean square algorithm, illustratively here the sign version, during adaptation to cause them to converge on values that will produce an output that is supposed to resemble closely a signal transmitted through the facility without ISI. Accurate convergence of all of the tap multiplier coefficients to values corresponding to least error with respect to the ideal no-ISI case will be limited by the uncorrected errors in the coefficient updates due to the precursor interference. Since the impulse response sample values are the multiplier coefficients in the ideal case, and the adaptations thereof that are the coefficient estimates, the same reference character $\underline{h}$ is used for both and the "hat" symbol ( $\char`\^$ ) ) over the character distinguishes the estimates from the actual amplitude sample values.

Generally, the phenomenon of precursor ISI appears on subscriber loop circuits with bridged taps. Approximately 80% of the installed subscriber loop plant includes bridged taps. Such precursor ISI on loops with substantial signal has limited acceptable performance of prior DFEs. In order to compensate for precursors, more elaborate techniques using linear equalizers and/or multibit word multipliers usually have been required.

Although the true information state of a bit having a precursor effect cannot be known until it is actually received, it has been found that the size of the precursor tap coefficient estimate $\hat{h}_{-1}$ error effect can be determined and utilized during real time operation. It can be shown that the eye size with ISI is equal to twice the difference between absolute values of sample amplitudes $h_0$ and $h_{-1}$ for successive bits k and $k+1$, respectively. It can be further shown that the difference between those values is approximately equal to the difference between similarly designated tap coefficient estimates of either of those bit times alone. The latter difference is used, as hereinafter illustratively described, as a measure of the extent of precursor error, which measure is used to control adjustment of converter 19 sampling time phase, without actually subtracting out the precursor error, to maximize the eye. The same measure is also used to obtain more precise, updated, coefficient estimates so that a more representative eye pattern is obtained and hence a lower error rate is possible.

Resuming with a consideration of FIG. 1, adder 21 arithmetically combines each multibit digital sample value in the signal $S_k$ with a corresponding multibit value corresponding to the post cursor error estimate $\hat{P}_k$ for that sample time as determined in a manner to be described. The resulting sum for the particular sample time is applied to a threshold decision circuit 22 in which the sample time sum is compared to a reference value to determine whether the sample represents a binary ONE or a binary ZERO. The decision circuit advantageously produces a digital binary output which indicates whether the sign of the sum is plus or minus. That decision output, designated $d_k$ where k is the same sample time as that of the input S, is coupled through the equalizer output, i.e. the portion of the Data Out circuit extending to switch 14 in FIG. 2. The decision output is also coupled back through a one-sample-time delay circuit 23, which is advantageously a bistable circuit for the one-bit $d_k$ output signal, as the signal $d_{k-1}$, to the data input of a precursor estimator filter 26.

Figure 4:
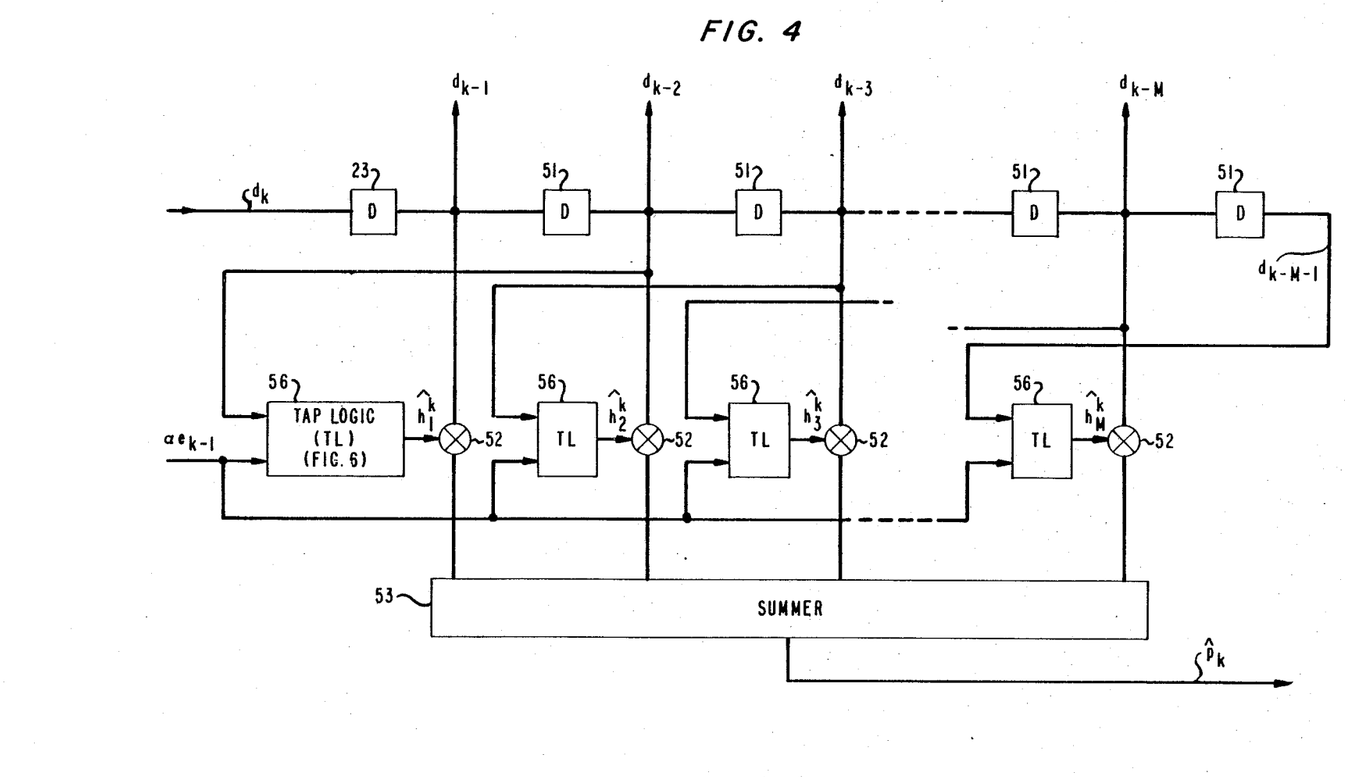
FIGS. 4 and 5 are diagrams of transversal filters employed in the equalizer of FIG. 1.

Filter 26 is advantageously a transversal filter designated to develop compensating postcursor interference components for application as output $\hat{P}_k$ to adder 21. That output is indicative of the value of the postcursor error interference at that time. This is a well known function of such transversal filters in decision feedback equalizers and an example of such a filter is shown in FIG. 4. Such filters have a tapped delay line including serially connected, sample period, delay circuits 51 receiving the output of delay circuit 23. The taps are connected through respective coefficient multipliers 52 and a tap signal summation circuit 53, the output $\hat{P}_k$ of which is the filter output. In one illustrative embodiment of the illustrative DFE considered herein, the filter 26 was provided with five taps for postcursor error estimate development and one for direct current component cancellation.

Each multiplier receives a multiplier coefficient estimate from its separate tap logic (TL) circuit 56, which will be discussed in greater detail in connection with FIG. 6. Each such circuit 56 is responsive to a common error signal $\alpha e_{k-1}$ and to a filter tapping point signal from a tap circuit in a position one sample time more delayed along the filter delay line than is the multiplier associated with the tap logic circuit.

Respective tapping point signals along the delay line of filter 26 are also brought out as the signal $d_{k-1}$ through $d_{k-M-1}$, where M is the number of postcursor estimator filter taps, and coupled to respective inputs of a coefficient update logic circuit 27, to be described in connection with FIG. 6. That group of differently delayed tapping point signals is collectively represented at an input to a coefficient update logic circuit 27 as $d_K$, where K represents collectively the whole group of differently delayed impulse response sampling times associated with an arbitrary sampling time decision bit $d_k$. In the logic circuit 27, the signals of the set of differently delayed signals are utilized, in conjunction with an error signal $\alpha e_{k-1}$, to be described, to develop a set of transversal filter, tap multiplier, coefficient estimate signals including the coefficient signals $\hat{h}_1{}^k$ through $\hat{h}_M{}^k$ which are applied back to the tap multipliers of filter 26. Those coefficient signals have thereby been adapted to cause the filter 26 to cooperate with the adder 21 so that the equalizer output $d_k$ will produce a smaller error signal at the output from a multiplier 31.

Figure 5:
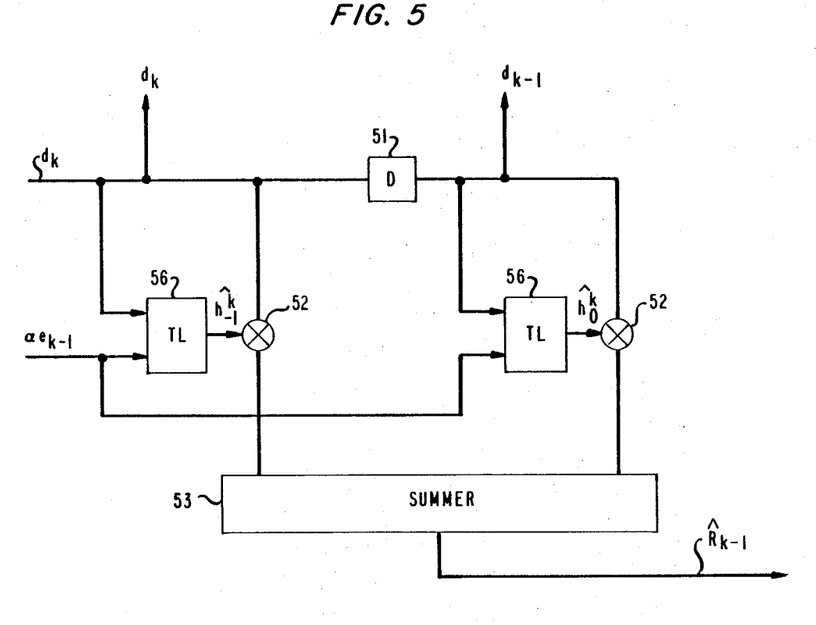

Equalizer output $d_k$ is also applied to a main cursor and precursor estimator filter 28 which is advantageously another transversal filter designed to produce at its output a signal which is an estimate of the magnitude of the main cursor and precursor component of the input signal $S_k$. Filter 28 has a number of precursor tap equal to the significant number of precursor interfering samples. In this embodiment, the DFE output signal $d_k$ is treated as a tapping point signal; and a single one-sample-time-delayed signal version $d_{k-1}$ is treated as a further tapping point signal. An example of the precursor estimator filter is shown in FIG. 5 where circuit elements like those in FIG. 4 are indicated by the same reference characters. Aside from the fewer number of tap circuits, a distinction is that in FIG. 5 the filter tapping point signal input to each tap logic circuit 56 is derived from a delay line tapping point signal from the same tap circuit in which the output of that logic circuit is employed.

The two, i.e. main cursor and precursor, corresponding filter taps have been found to produce satisfactory operation for applications such as the one illustratively considered herein. Note that the delayed tapping point signal $d_{k-1}$ of filter 28 is the same as the like-designated signal at the output of delay circuit 23. Filter 28 also receives a set of adapted tap multiplier coefficients $\hat{h}_{-1}{}^k$ through $\hat{h}_0{}^k$ from the coefficient update logic circuit 27.

Output $\hat{R}_{k-1}$ from filter 28 is applied subtractively to an adder 29 where it is subtracted from a one-sample-time-delayed, by a delay circuit 30, version of the output of adder 21. The circuit 30 is, e.g., a shift register having a length to produce a delay approximately equal to the delay time for adder 21 output signal transmission through decision circuit 22 and filter 28. Thus, the multibit difference output of adder 29 represents the input signal $S_k$ corrected in adder 21 for postcursor effects and further corrected in adder 29 for precursor and main cursor effects; and that difference output is now considered to be an error signal $e_{k-1}$ to be used for updating filter tap multiplier coefficients. The adder 29 difference output is applied to a multiplier 31 wherein it is adjusted by a factor $\alpha$ before being applied to the update logic 27 as an adjusted error signal $\alpha e_{k-1}$. That factor has a value selected to place it in an appropriate magnitude range so that the one error signal, when operated upon by respective ones of the filter delay line tapping signals, will produce respective coefficient adjustment signals for all of the taps to lead to stable reliable DFE operation. In the digital embodiment of the DFE here under consideration, the function of multiplier 31 is advantageously implemented by performing a threshold operation, i.e. the sign update algorithm, on the error signal $e_{k-1}$ and using a hard-wired circuit path version of alpha to steer the resulting single bit error signal to the correct bit position of a coefficient to effect the adaptation by the predetermined increment, all as described in connection with FIG. 6.

Figure 6:
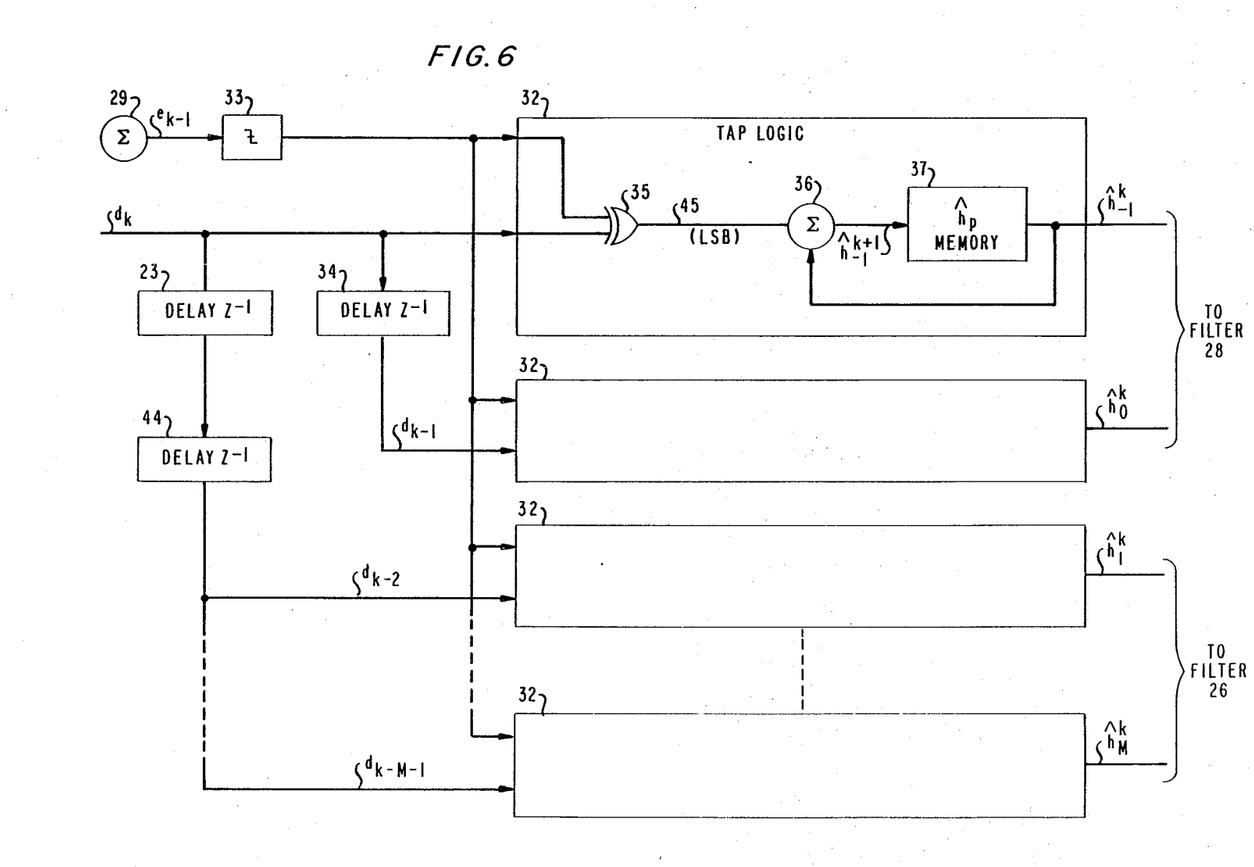
FIG. 6 is a diagram of coefficient update logic employed in the equalizer of FIG. 1.

FIG. 6 depicts in greater detail the coefficient update logic circuit 27. Included are plural sets 32 of tap logic, one for each of the different tapping point signals from the filters 26 and 28 and only four of which sets are specifically shown in the drawing. The sets of tap logic are actually part of their respective filters, but they are separately shown to simplify the drawing. Thus, the sets for tapping point signals $d_k$ and $d_{k-1}$ are part of filter 28; and the sets for the remaining tapping point signals are part of the filter 26. Signal reference characters in FIG. 6 include subscripts to indicate correspondence to respective sampling times in the pulse response of FIG. 3, superscripts to indicate an arbitrary current sampling time interval k in an adaptation sequence and relationships of other sampling time intervals to that arbitrary interval.

Each set of tap logic receives at one input a different one of the tapping point signals, respectively. DFE output signal $d_k$ is applied directly to the logic set 32 for the estimated coefficient $\hat{h}_{-1}{}^k$ and applied after one sample time delay in a delay circuit 34 to the logic set 32 for the estimated coefficient $\hat{h}_0{}^k$. Delay circuit 34 represents the delay line delay of the filter 28 transversal filter. Signal $d_k$ is also coupled through the delay 23 and a further one-sample-time delay circuit 44 to become the tapping point signal $d_{k-2}$ which is applied to another logic set 32 to produce the estimated coefficient $\hat{h}_1{}^k$. The output of delay circuit 44 is coupled through additional delay circuits (not shown) to produce other tapping point signals of filter 26, and comprise with that circuit 44 the delay line of filter 26, which are employed in respective logic sets 32 to produce the respective further additional estimated coefficients employed in that filter.

As previously mentioned, the multibit error signal $e_{k-1}$ is advantageously applied to a threshold circuit 33 to produce a single-bit output indicating whether the error signal is positive or negative. That single-bit error signal indicator is then applied in parallel to all of the tap logic sets 32. Since all of the sets are the same, detail of only one, that for the signal $d_k$, is specifically shown in FIG. 6. In that set, the respective filter tapping point signal, $d_k$, and the error signal indicator from circuit 33 are applied to different inputs of an EXCLUSIVE OR circuit 35, the product output of which is coupled by a lead 45 to a preselected bit position, illustratively the least significant bit position, of one input of a multibit adder 36. That selection establishes the size of the coefficient adaptation increment to be used, is the same for all of the tap logic sets 32, and is the hard-wired implementation of the application of multiplication factor $\alpha$ of FIG. 1. If the error signal indicator from circuit 33 is positive (a ONE), the tapping point signal (which may be either ONE or ZERO) is inverted as coupled on lead 45 to adder 36 where it increments or decrements, depending on the binary stat of the output of gate 35, the LSB of the prior coefficient estimate to produce an error reducing effect on the newly adapted coefficient. If the error signal indicator from circuit 33 is negative (a ZERO) the tapping point signal is used in true form to increment or decrement, depending on the binary state of the output of gate 35, the LSB of the prior coefficient estimate to produce an error reducing effect on the newly adapted coefficient. After filter convergence the coefficients hunt about their optimum values.

A second input to adder 36 receives a multibit coefficient estimate from a current sampling time k, i.e. $\hat{h}_{-1}{}^k$; and the adder output is the adapted version of the estimated coefficient $\hat{h}_{-1}{}^{k+1}$ for use in the next sampling time interval k+1. The adaptation involves incrementing or decrementing the LSB position of the input coefficient estimate depending upon the binary state of the signal on lead 45. That adapted multibit estimate is stored in a coefficient memory 37 to be available when needed in that interval k+1. Memory 37 is advantageously a circulating shift register in which the coefficient bits are available to receive information for storage from the output of adder 36 in one phase of a sampling time interval and available to supply output both to the adder 36 input and to a transversal filter tap multiplier (not shown in FIG. 6) in another later phase of the same sampling time interval.

Thus, the tap logic output is a multibit, digital value that is used as a tap multiplier coefficient at the indicated tap of one of the filters 26 and 28 in FIG. 1.

It can now be seen in FIG. 6 that to obtain the adapted coefficient estimate, e.g., $\hat{h}_{-1}{}^k$, for a tap in the main cursor and precursor estimator filter 28 the common error signal (from circuit 33) is multiplied (in EXCLUSIVE OR circuit 35) at the tap logic circuit set 32 by the tapping point signal, e.g., $d_k$, for the same sample time. On the other hand, to obtain the coefficient estimate, e.g., $\hat{h}_1{}^k$, for a tap in the postcursor estimator filter 26, the common error signal is multiplied at the tap logic circuit set 32 for that tap by the tapping point signal, e.g., $d_{k-2}$, for one sample time more delayed than the tapping point signal corresponding to the last mentioned tap.

Figure 7:
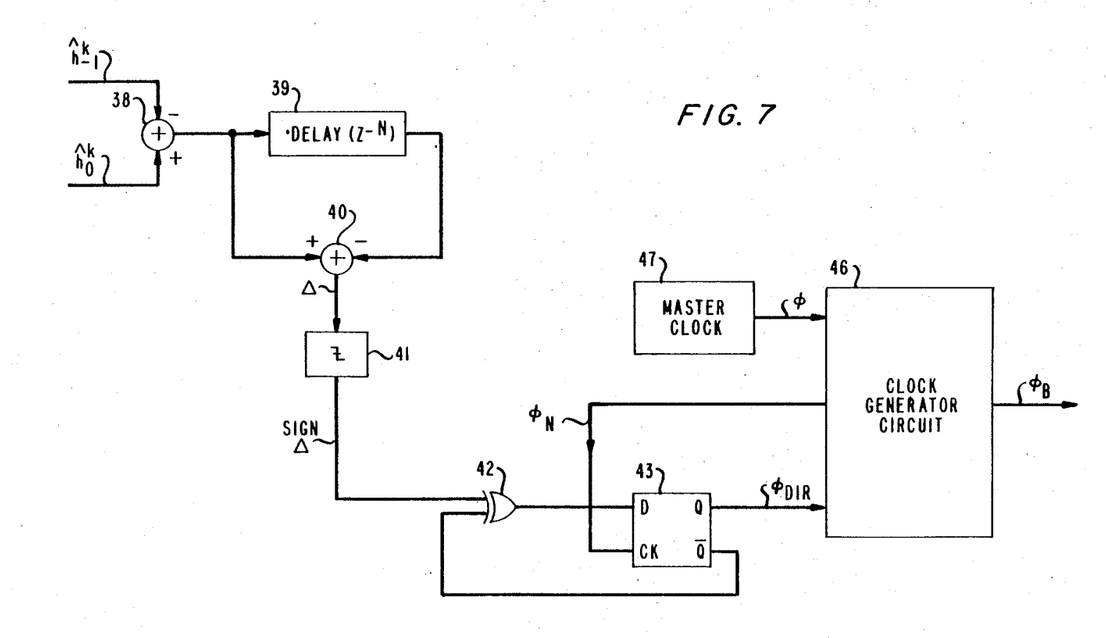
FIG. 7 is a diagram of sampling phase control logic employed in the equalizer of FIG. 1.

In FIG. 7 there is shown detail of the FIG. 1 sampling phase control logic 20. It is useful to remind here that the impulse response sample amplitudes of FIG. 3 for a particular subscriber loop are also the ideal coefficients to be used by the tap multipliers of the transversal estimator filters of FIG. 1; so the amplitudes are indicated by "h" and the coefficients estimates by "$\hat{h}$." Logic 20 receives from the update logic 27 the updated tap coefficient estimates for precursor estimator filter 28. Sampling phase is adjusted as a function of the magnitude of difference between those two tap coefficient estimates. It can be seen in FIG. 3 that the largest data eye, i.e. the optimum error rate and hence the best sampling phase, occurs when that difference is a maximum with $h_0{}^k$ larger than $h_{-1}{}^k$. The function of logic circuit 20 is to maximize the steady state value of data eye heights at sampling time. If the sampling phase changes in either direction, with respect to the impulse response, the difference becomes less. Accordingly, circuit 20 compares the differences for widely time separated pairs of adjacent sample times and thereby detects a reduction or an increase in eye size. When the comparison produces a Δ signal output of the correct polarity, e.g., positive, sampling phase adjustment is continued in the same direction to try to increase the eye further. i.e. shift sampling time to a phase of larger eye height in the presampled data signal eye. When the comparison produces a negative Δ signal, sampling phase adjustment direction is reversed to try to restore an increasing eye size tendency.

The exact size of the separation time between differences is not critical; but it must be sufficient to allow filters 26 and 28 to adapt to any expected new clock phase adjustment. In one embodiment operating at a sampling rate of 160,000 samples per second, and 160 kbps, a time separation of about three milliseconds, or about 480 bit times, produced satisfactory operation.

The algorithm used for the comparison of coefficient magnitude differences is expressed in a two-step fashion as:

If $(\hat{h}_0 - \hat{h}_{-1})_j > (\hat{h}_0 - \hat{h}_{-1})_{j-1}$,   1.

then adjust the sampling clock phase one unit in the same direction as the previous adjustment. The subscripts j and j−1 above indicate instants separated in time by magnitude of the previously indicated separation time between differences, i.e.

$(J) - (J-1) = No.$

If $(\hat{h}_0 - \hat{h}_{-1})_j < (\hat{h}_0 - \hat{h}_{-1})_{j-1}$,   2.

then adjust phase of the sampling clock one unit in the opposite direction from that of the previous adjustment. The exact size of the unit of phase adjustment is not critical as long as it is sufficiently small to prevent a sudden phase change from causing data decision errors once the decision feedback equalizer has converged. In the aforementioned specific embodiment, a unit of 1/40th of a bit period, i.e. approximately 156 nanoseconds out of 6.25 microseconds, was found to produce satisfactory operation.

FIG. 7 depicts one illustrative embodiment of the sampling phase control logic 20 provided for implementing the phase adjustment algorithm just described. Two filter tap coefficient estimates for the main cursor tap $\hat{h}_0{}^k$ and the precursor tap $\hat{h}_{-1}{}^k$ are applied to a multibit adder 38 in appropriate phase for subtracting the precursor coefficient estimate from the main coefficient estimate.

Output of adder 38 is a multibit digital value and is applied in parallel to an N-sample delay circuit 39 and to an input of a multibit adder 40. Each delayed. coefficient pair, difference value from the output of delay circuit 39 is in adder 40 subtracted from the current, coefficient pair, difference value; and the difference Δ is coupled through a detector circuit 41 to determine the sign of the difference, i.e. SIGN Δ. The binary, single-bit output of detector 41 is coupled through an EXCLUSIVE OR circuit 42 to the data input of a D-type bistable, or flip-flop, circuit 43, the true output of which is a $\phi_{DIR}$ signal that is employed to control the add-/delete operation in a clock generator circuit 46 that is driven from a master clock 47. The complement output $\overline{Q}$ is coupled back to an input of the EXCLUSIVE OR circuit 52 to invert the SIGN Δ signal when the bistable 43 is in its reset state with $\overline{Q}$ high and apply that signal in true form when the bistable is in its set state. Thus, when the sign of the detector 41 output changes from positive to negative, the onset of decrease in eye size is indicated; and the $\phi_{DIR}$ signal reversed the direction of change in phase of the sampling control signal $\phi_B$ to try to restore the increasing eye size trend. As previously noted, each increment of phase change of either direction is illustratively one-fortieth of a bit interval in the DFE input signal $f_k$.

Clock generator circuit 46 also produces a still lower frequency output signal $\phi_N$. The latter signal frequency fixes the number of bauds in the time interval N between successive differences compared at adder 40, and a rate of 333 Hertz is illustratively employed. $\phi_N$ is applied to the clocking input of the D-type bistable circuit 43 to sample the polarity indicator signal periodically.

Although the invention has been described in connection with a particular embodiment thereof, it is to be understood that additional embodiments. modifications, and applications which will be obvious to those skilled in the art are included within the spirit and scope of the invention.

What is claimed is:

1. In a decision feedback equalizer having a postcursor error effect estimator means in a feedback path thereof
    means for estimating predetermined cursor effects, including precursor error effect, in an output of said equalizer,
    means, responsive to an output of said predetermined cursor effect estimating means, for developing an error signal which is indicative of the size of at least said precursor error effect, and
    means, responsive to said error signal, for modifying operation of both of said predetermined cursor and postcursor estimating means in a direction to reduce respective error effects in said equalizer output.

2. The decision feedback equalizer in accordance with claim 1 in which there are provided
    means for recurrently sampling data signals at an input to said equalizer,
    means, responsive to said modifying means, for measuring eye height of a data signal in an output of said equalizer, and
    means, responsive to said measuring means, for adjusting sampling time of data signals in said sampling means to maximize the steady state value of said eye height.

3. The decision feedback equalizer in accordance with any of claims 1 and 2 in which each of said estimating means comprises
    a transversal filter having a tapped delay line, a plurality of tapping point circuits each connected to a different tapping point along said delay line and each having tap signal multiplier means for multiplying the respective tapping point signals by respective impulse-response-representative coefficient estimate signals, and means for summing multiplier means output signals from all tapping point circuits of such estimating means to produce an estimating means output signal,
    a plurality of tap logic circuits to provide respective coefficient estimate signals to each of said multiplier means,
    means for applying said error signal to a first input of each of said tap logic circuits,
    means for applying a predetermined different one of said tapping point signals to a second input of each of said tap logic circuits, and
    means, in each of said tap logic circuits and responsive to signals at said first and second inputs thereof, for adapting said respective coefficient estimate signal of said each tap logic circuit to reduce said error signal.

4. In a decision feedback equalizer for use with respect to digital data input signals subject to intersymbol interference comprising both precursor and postcursor error effects, said equalizer including a feedback path transversal filter for postcursor error estimation, said filter having a set of controllably variable, impulse-response-based, operation determinative coefficients, and said equalizer further includes means for adapting said filter coefficients to variable transmission conditions, said adapting means comprising
    means for measuring predetermined cursor effects, including at least said precursor error effect, on each baud time output of said equalizer, and
    means, responsive to an output of said measuring means, for modifying said filter coefficients in a direction to reduce said postcursor error effect in said equalizer output.

5. The decision feedback equalizer in accordance with claim 4 in which said filter comprises
    a tapped delay line for receiving signals from said equalizer output,
    a plurality of tap circuits, each corresponding to a different one of said coefficients connected at respective predetermined tapping points along said delay line and each having means for multiplying its coefficient by its tapping point signal to produce a tap output signal,
    means for summing all of said tap output signals from said tap circuits to produce a filter output signal that is an estimate of said postcursor error effect, and
    said tap circuits each including,
        means for multiplying said output of said measuring means by a tapping point signal one data signal symbol time prior to the symbol time corresponding to said each tap circuit, and
        means responsive to an output of said modifying means, for adapting said coefficient for such tap circuit in a direction to reduce said postcursor error effect.

6. The decision feedback equalizer in accordance with claim 5 in which
    said means for multiplying said output of said measuring means comprises means for EXCLUSIVE ORing said error signal and said one-symbol-time-prior tapping point signal, and
    said adapting means comprises means for storing a coefficient estimate to be available at an output of said storing means, and means for incrementing or decrementing a predetermined bit order position of the last-mentioned coefficient estimate depending upon the binary signal state of the output of said EXCLUSIVE ORing means whereby such coefficient estimate is adapted according to said error signal.

7. The decision feedback equalizer in accordance with claim 5 in which said measuring means comprises
    a precursor estimator transversal filter connected between said equalizer output and said coefficient modifying means, said precursor filter having a set of controllably variable, impulse-response-based, operation determinative, coefficient estimates, and said filter comprising
    a tapped delay line for receiving signals from said equalizer output, a plurality of tap circuits, each corresponding to a different one of said precursor filter coefficient estimates, connected at respective predetermined tapping points along said precursor filter delay line and each having means for summing all of said precursor filter tap output signals from said tap circuits of such precursor filter to produce a filter output signal that includes an estimate of said precursor error effect, and said precursor filter tap circuits each including, means for multiplying said output of said measuring means by the precursor filter tapping point signal for the same symbol time as the symbol time corresponding to said each precursor filter tap circuit, and means, responsive to an output of said modifying means, for increasing or decreasing said coefficient for such tap circuit in a direction to reduce said precursor error effect.

8. The decision feedback equalizer in accordance with claim 7 in which there are provided means for recurrently sampling said digital data input signals in predetermined phases thereof, said precursor filter has at least two of said tap circuits, a main cursor symbol time tap circuit and a precursor symbol time tap circuit, providing a main cursor coefficient estimate and a precursor coefficient estimate, respectively, means for comparing coefficient estimate differences between said main and precursor coefficient estimates for symbol times separated by a plurality of symbol times sufficient to allow said equalizer to stabilize its phase, means, responsive to an output of said comparing means, for developing a binary signal representative of the direction of change in comparing means output polarity, and means, responsive to an output of said developing means, for changing the phase of operation of said sampling means in a direction tending to maximize the amplitude of said coefficient estimate differences of a predetermined polarity.

9. The decision feedback equalizer in accordance with claim 4 in which said equalizer includes a forward signal transmission path having a signal level decision circuit for producing an equalizer output signal, said measuring means comprises precursor estimator means coupled to an output of said decision circuit for developing a signal having a level which is indicative of the extent of said precursor effect, said coefficient modifying means comprises means coupled to an input of said decision circuit for developing a representing of signals at said input but delayed in time by an amount corresponding to signal delay during transmission through said decision circuit and said measuring means, means, responsive to outputs of said measuring means and said developing means, for producing an error signal having a binary state indicative of the difference between such outputs, and coefficient update logic means, responsive to said error signal and to an output of said decision circuit, for updating coefficients of said precursor equalizer in a direction to reduce said error signal.

10. The decision feedback equalizer in accordance with claim 9 in which means are provided for coupling further outputs of said coefficient update logic means to provide to said feedback path transversal filter coefficients updated in a direction to reduce said postcursor effects.

11. The decision feedback equalizer in accordance with claim 4 in which said input signals are binary coded signals in which time superimposed traces of successive bauds define an enclosed geometric figure having an opening eye of a height which is a function of said intersymbol interference and in which equalizer there are provided means for recurrently sampling said input signals in an adjustable phase time of each baud period to cause operation of said equalizer with respect to discrete successive samples thereof, and means, responsive to coefficients from said adapting means, for adjusting the phase of operation of said sampling means toward a time of maximum, presample, digital signal eye.

* * * * *